Jan. 23, 1973  H. BONN ET AL  3,712,968
VEHICLE-STEERING WHEEL WITH HORN-ACTUATING BAFFLE PLATE
Filed March 24, 1971  3 Sheets-Sheet 1

Inventors:
HELMUT BONN
KONRAD RANDELZHOFER
BY Karl F. Ross
ATTORNEY

United States Patent Office 3,712,968
Patented Jan. 23, 1973

3,712,968
VEHICLE-STEERING WHEEL WITH HORN-ACTUATING BAFFLE PLATE
Helmut Bonn and Konrad Randelzhofer, Aschaffenburg, Germany, assignors to Lenkradwerk Gustav Petri Aktiengesellschaft, Aschaffenburg, Germany
Filed Mar. 24, 1971, Ser. No. 127,646
Claims priority, application Germany, May 5, 1970,
P 20 21 930.1
Int. Cl. H01h 9/00
U.S. Cl. 200—61.56                                 6 Claims

ABSTRACT OF THE DISCLOSURE

A steering wheel for automotive vehicles comprising a plurality of spokes, a baffle plate resiliently mounted on the spokes, horn operating first contacts mounted on the underside of said baffle plate adapted to engage second contacts mounted directly on the spokes, such that when said first and second contacts are mutually engaged, a signal is produced.

(1) BACKGROUND OF THE INVENTION

It is known with steering wheels with baffle plates to mount the baffle plate on, for example, a three-armed contact yoke which is arranged over the spokes of the steering wheel and, in conjunction with contacts located in or on the spokes of the steering wheel, is used for producing signals, for example, to activate a horn. The steering wheel requires means both for retaining the contact ring and retaining the baffle plate and difficulties are encountered in insulating the yoke in the region of the contact device.

(2) SUMMARY OF THE INVENTION

The present invention aims to overcome these disadvantages. In accordance with the present invention, there is therefore provided a steering wheel for automotive vehicles comprising a plurality of spokes, a baffle plate resiliently mounted on or in these spokes, and first contacts mounted on the underside of the baffle plate adapted to engage second contacts mounted directly on or in the spokes, such that when said first and second contacts are mutually engaged a signal is produced.

Preferably, the resilient mounting of the baffle plate onto the steering wheel is achieved by providing bushes made of insulating material on or in the spokes of the steering wheel, the bushes having an annular, outwardly protruding bead, the bushes being adapted to engage in cup-shaped members in the baffle plate which are also made of insulating material. The baffle plate is retained against the pressure of an interposed helical spring by means of resilient holders against the outer beads of the bushes. Alternatively the bushes with their beads can be located on the baffle plate and the parts retaining the bushes can be mounted on the steering wheel.

(3) DESCRIPTION OF THE DRAWING

The present invention will hereinafter be described with reference to the accompanying drawing, in which.

(4) SPECIFIC DESCRIPTION

In all the figures, a steering wheel is denoted by numeral 1 and a baffle plate is denoted by numeral 2.

Figure 1:
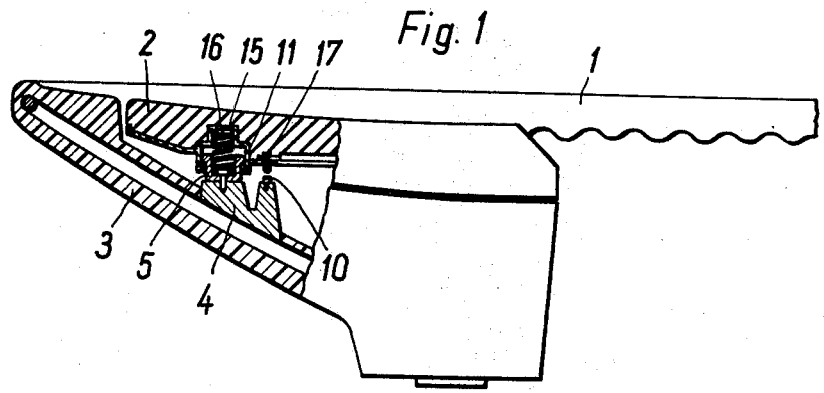
FIG. 1 shows a first embodiment of a steering wheel according to the present invention, partly in section.
Figure 2:
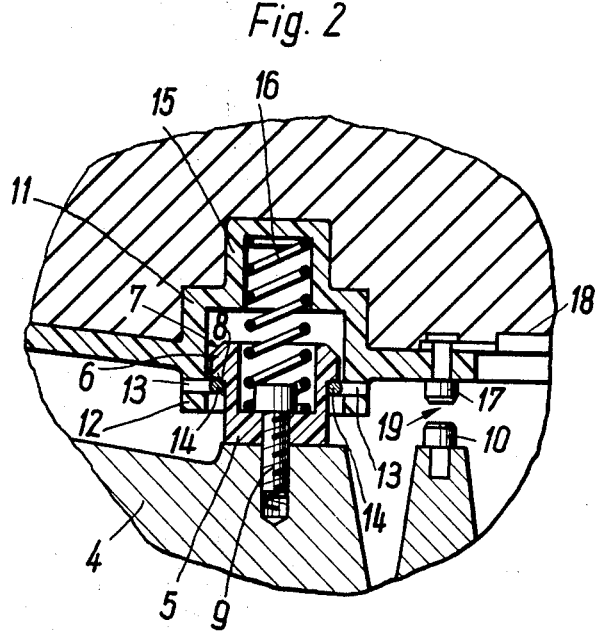
FIG. 2 shows an enlarged detail of the steering wheel of FIG. 1.

In the embodiment shown in FIGS. 1 and 2, spokes 3 have upwardly facing bosses 4 mounted thereon. Bushes 5 are fixed to the bosses 4 by means of screws 9. An annular bead 6 which is chamfered as shown at 7 is provided on the upper outside end of each bush 5. The lower annular surface 8 of the bead 6 is bevelled slightly upwards. Contacts 10 are arranged on pedestals of the steering wheel spokes 3 equidistant from each bush 5. The baffle plate 2 has cup-shaped members 11 made of an insulating material which have annular protruding edges 12. These members 11 are located the bushes 5 which are also made of insulating material. The inner diameter of the members 11 corresponds to the outer diameter of the annular beads 6 and is adapted to receive the annular beads 6. The wall of each cup-shaped member 11 is apertured at two opposite points by slots 13 by means of which shanks 14 of a hairpin-shaped spring engage in the interior of the cup-shaped member 11 and slightly constrict it in the region of the slots 13. In the base part 15 of each cup-shaped member 11 a helical spring 16 is mounted, which on insertion of the bush 5 into the member 11 is supported against the base of the bush. Contacts 17 spaced from the members 11 are arranged on the baffle plate 2 opposite the contacts 10 and are connected to an electric lead 18.

In the embodiment described above with reference to FIGS. 1 and 2, the baffle plate 2 is fixed to the steering wheel 1 in a simple manner. The cup-shaped members 11 of the baffle plate 2 are pushed over the bushes 5 against the pressure of springs 16 such that the beads 6 are forced into the members 11 by forcing the spring arms 14 apart. The spring arms 14 engage behind the beads 6 and so retain the bushes 5 in the members 11. In this position, the contacts 10 and 17 are spaced from each other in the open position. The contact spacing is denoted by 19.

The baffle plate 2 can be disengaged by pulling it off, the beads 6 sliding out of the cup-shaped members 11 by forcing the spring arms 14 apart.

Figure 3:
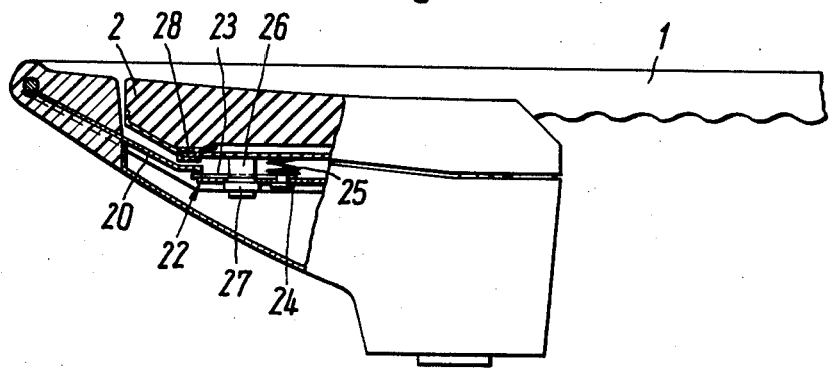
FIG. 3 shows a steering wheel partly in section in accordance with a second embodiment of the present invention.
Figure 4:
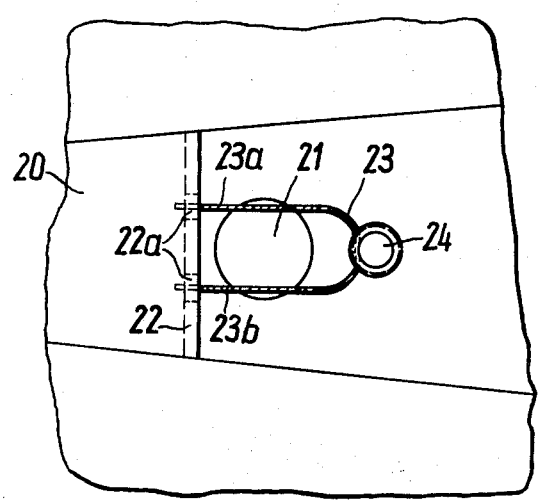
FIG. 4 shows an enlarged detail of FIG. 3.

FIGS. 3 and 4 show a second embodiment of the present invention in which spokes 20 are made of flat material, such as sheet metal. Each spoke 20 has a bore 21 (see especially FIG. 4) provided therethrough and a shoulder 22 machined thereon. The shoulder 22 being spaced from the bore 21 in the direction of the steering wheel rim. In front of the bore 21 a hairpin-shaped spring 23 is mounted in such a manner that the spring shanks 23a and 23b engage beyond the bore, behind which its ends are retained in apertures 22a in the vertical part of the shoulder 22. The hairpin-shaped springs are secured by rivets 24, which simultaneously mount spiral springs 25 to the shoulder 22. The upper supporting surface of the shoulder 22 acts as a contact and, the rear portion of the shoulder 22 acts as holding means for the baffle plate 2. Retaining pins 26 with annular beads 27 are mounted on the underside of the baffle plate 2 opposite to the bores 21 the spokes 20. When the baffle plate 2 and steering wheel 1 are pressed together, the beads 27 are pressed into the bores 21 thereby deflecting the shanks 23a and 23b of the springs 23, until the spring shanks engage behind the beads 27. The numeral 28 denotes contacts connected to an electric lead on the baffle plate 2, which are retained in spaced relationship with the shoulders 22 on the spokes 20 by the springs 25.

Figure 5:
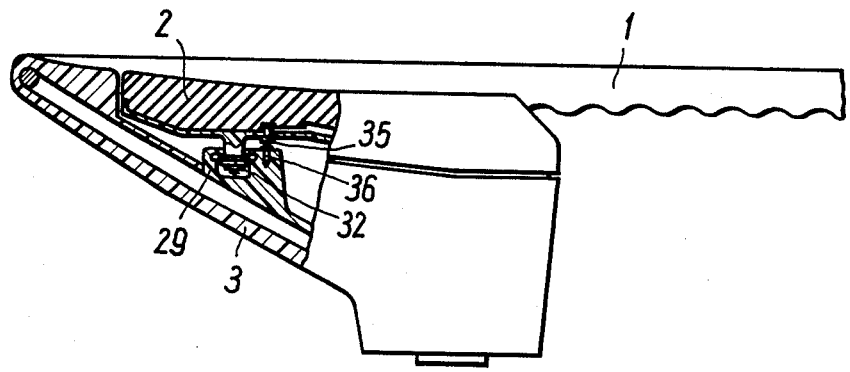
FIG. 5 shows a steering wheel partly in section in accordance with a third embodiment of the present invention.
Figure 6:
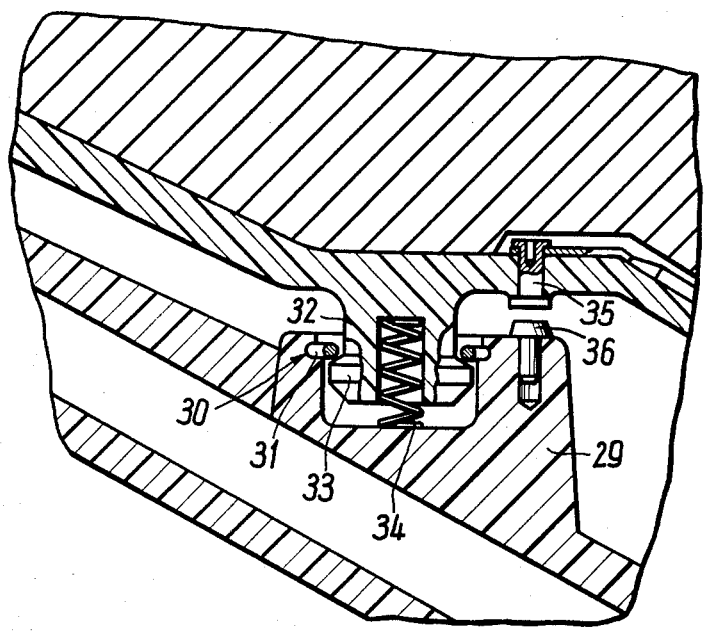
FIG. 6 shows an enlarged detail of FIG. 5.

FIGS. 5 and 6 show an embodiment of the present invention which is similar to that shown in FIGS. 1 and 2. However, the embodiment shown in FIGS. 5 and 6 differs from that of FIGS. 1 and 2 in that bosses 29 mounted on the spokes 3 are hollow and have an annular groove 30 formed in their inside wall to receive a spring 31. Further, hollow pins 32 with beads 33 are arranged below the baffle plate 2 opposite to the bosses 29. Spacing springs 34 are located in the pins 32 and the beads 33 thereof enagage behind springs 31 when the parts are pressed together. The contacts in FIGS. 5 and 6 are denoted by 35 and 36.

The present invention has the advantages that the structure of the steering wheel is simple and easy to fit. The baffle plate simultaneously acts to emit signals, for example, to activate a horn. The contact yoke hithertofore considered necessary and the difficulties and costs connected with its installation are omitted in accordance with the present invention. The baffle plate simultaneously acts as baffle guard and as a contactor and thus fulfills two independent functions. However, despite its double function, the baffle plate can be assembled or disassembled with one manipulation.

We claim:

1. An automotive-vehicle steering wheel comprising a wheel member consisting of a hub, a plurality of spokes radiating from said hub and a rim extending around and joined to said spokes; first contacts mounted directly upon said spokes; a signal-operating baffle-plate member overlying said first contacts and provided with second contacts aligned and engageable with said first contacts to produce a signal; springs interposed between said spokes and said baffle-plate member for yielding urging said second contacts away from and into spaced relationship with said first contacts; interfitting pairs of formations directly formed on said baffle-plate member and the spokes of said wheel member for limiting displacement of said baffle-plate member by said springs while enabling displacement of said baffle-plate member against said springs to bring at least one first and second contact into engagement; and a respective retaining element on one formation of each pair yieldably retaining the other formation of the pair against withdrawal.

2. The steering wheel defined in claim 1 wherein the formations of each pair include a sleeve on one of said members and a bush projecting from the other member and receivable in the respective sleeve, said bush being formed with an outwardly bulging bead adapted to deflect the respective retaining element upon insertion of each bush into the respective sleeve.

3. The steering wheel defined in claim 2 wherein said retaining element is a hairpin spring received in each sleeve and having shanks adapted to embrace the respective bush behind the bead.

4. The steering wheel defined in claim 3 wherein each of said springs is provided within each respective sleeve.

5. The steering wheel defined in claim 4 wherein said buhes are tubular and said springs extend into said bushes.

6. The steering wheel defined in claim 5 wherein said bushes are formed on said baffle-plate member and said sleeves are formed on said spokes.

References Cited

UNITED STATES PATENTS 3,517,145   6/1970   Wallace _____ 200—61.55

ROBERT K. SCHAEFER, Primary Examiner

M. GINSBURG, Assistant Examiner